United States Patent
Viehweider et al.

(10) Patent No.: US 10,003,197 B2
(45) Date of Patent: Jun. 19, 2018

(54) ENERGY MANAGEMENT METHOD AND SYSTEM FOR ENERGY SUPPLY SYSTEM

(71) Applicant: NEC CORPORATION, Tokyo (JP)

(72) Inventors: Alexander Viehweider, Tokyo (JP); Koji Kudo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 100 days.

(21) Appl. No.: 15/129,114

(22) PCT Filed: Mar. 27, 2014

(86) PCT No.: PCT/JP2014/059789
§ 371 (c)(1),
(2) Date: Sep. 26, 2016

(87) PCT Pub. No.: WO2015/145784
PCT Pub. Date: Oct. 1, 2015

(65) Prior Publication Data
US 2017/0117710 A1    Apr. 27, 2017

(51) Int. Cl.
*H02J 3/38* (2006.01)
*H02J 7/00* (2006.01)
*H02J 3/00* (2006.01)

(52) U.S. Cl.
CPC .............. *H02J 3/382* (2013.01); *H02J 3/383* (2013.01); *H02J 3/386* (2013.01); *H02J 7/0068* (2013.01); *H02J 2003/003* (2013.01)

(58) Field of Classification Search
CPC ..... H02J 3/382; H02J 7/0068; H02J 2003/003
See application file for complete search history.

(56) References Cited

U.S. PATENT DOCUMENTS

| 2001/0024105 A1 | 9/2001 | Abe |
| 2003/0025479 A1 | 2/2003 | Kikuchi |

(Continued)

FOREIGN PATENT DOCUMENTS

| JP | 9-285010 A | 10/1997 |
| JP | 2004-355219 A | 12/2004 |

(Continued)

OTHER PUBLICATIONS

Technical Whitepaper—SolarConnect™ Energy management solution for Base Stations—A Solar Powered Cellular Base Station [online]. Solar Semiconductor, 2010 [retrieved on Feb. 26, 2014]. Retrieved from the Internet: <URL: http://aptnk.in/wp-content/uploads/2010/05/Technical-Whitepaper.pdf>.

(Continued)

*Primary Examiner* — Robert Deberadinis
(74) *Attorney, Agent, or Firm* — Sughrue Mion, PLLC

(57) ABSTRACT

An energy management method for an energy supply system which includes at least an energy storage, a load and a generator with power dependent efficiency is provided. The method includes: calculating two time variant parameters indicating a discharge lower limit and an upper charge limit, respectively, of the energy storage, based on optimization using different kinds of prediction; and controlling, in a real time manner, charging and discharging of the energy storage and operation of the generator, with a certain priorities given to various power sources, such that state of charge of the energy storage is controlled within a region between the discharge lower limit and the upper charge limit. When a grid power is available, blackout duration probability function is predicted and used to calculate the discharge lower limit and the upper charge limit.

20 Claims, 9 Drawing Sheets

(56) References Cited

U.S. PATENT DOCUMENTS

2011/0115295 A1  5/2011  Moon et al.
2012/0181864 A1  7/2012  Honma et al.

FOREIGN PATENT DOCUMENTS

| JP | 2005-184890 A | 7/2005 |
|---|---|---|
| JP | 2006-101604 A | 4/2006 |
| JP | 2006-163914 A | 6/2006 |
| JP | 2007-34639 A | 2/2007 |
| JP | 2012-235541 A | 11/2012 |
| JP | 2013-134550 A | 7/2013 |
| JP | 2013-150473 A | 8/2013 |
| WO | 2013/002155 A1 | 1/2013 |

OTHER PUBLICATIONS

Ashok Jhunjhunwala et al., "Powering Cellular Base Stations: A Quantitative Analysis of Energy Options", [online]. Telecom Center of Excellence (RiTCOE), Indian Institute of Technology, Madras 2012 [retrieved on Feb. 26, 2014]. Retrieved from the Internet: <URL: http://www.tcoe.In/doc_download.php?doc_id=100.
International Search Report for PCT/JP2014/059789 dated Jul. 8, 2014.

ENERGY MANAGEMENT METHOD AND SYSTEM FOR ENERGY SUPPLY SYSTEM

CROSS REFERENCE TO RELATED APPLICATIONS

This application is a National Stage of International Application No. PCT/JP2014/059789 filed Mar. 27, 2014, the contents of which are incorporated herein by reference in their entirety.

TECHNICAL FIELD

The present invention relates to an intelligent energy management method and system for efficient energy management of an energy supply system which is equipped with an energy storage and a generator having PDE (power dependent efficiency) such as monotonically decreasing PDE.

BACKGROUND ART

Energy storages such as batteries are combined with power generators to constitute energy supply systems which supply electric power to various equipment. Such energy supply systems can operate without electric power from other sources such as grids (i.e., commercial power supplies) and renewable power sources (also known as "renewables"). Alternatively, energy supply systems can be supplied with power from grids and/or renewables. In some cases, grids are unreliable grids which often suffer blackout. Recently, energy storage systems are becoming cheaper, more compact and reliable, they can help to improve overall efficiency of energy supply systems by increasing the generator loading. However, various factors affect the efficiency of energy supply systems, and therefore, an energy management system which aids more efficient operation of the energy supply system is required.

The goal of the energy management system is to reduce cost and fuel consumption of the generator and keep generator wear within reasonable bounds by use of intelligent prediction, optimization and control. Also the inclusion of a renewable power source into the energy supply system can be managed by the energy management system.

A typical example would be the energy management for an energy supply system for a base transceiver station (BTS) which is equipped with a battery and a Diesel generator and connected with a grid subjected to blackouts, as it occurs typically in rural areas of developing countries. Typically in such applications, when the grid is available, the equipment such as BTS equipment and air conditioning take their energy from the grid, but during blackout, the energy for the load is taken from the energy storage and the Diesel generator (and sometimes also renewables such as PV (photo voltaic) generation and/or wind generation). Optimal charge/discharge cycles for the energy storage and appropriate on/off commands for the Diesel generator during off grid time lead to optimal operation of the energy supply.

Examples of the energy storage-based energy supply systems with no or sporadic grid supply are described in related art references [NPL1], [NPL2]. These systems do not use load prediction, and in the case that renewable generation is used, they do not use renewable generation prediction. Especially, the systems neither use blackout duration probability function prediction technology nor provide means to include uncertainty in the optimization of the charge/discharge pattern and the generator on/off command.

Therefore, the systems of the related arts, fuel and cost optimality by choosing the right charge/discharge pattern of the battery and the generator on/off command cannot be achieved. The systems of the related arts do not use the available information as best as possible.

The problem with related-art systems is that, for example, it is not guaranteed that at the end of the blackout the energy storage (typically, a battery) is not unnecessarily charged and that the generator runs most efficiently considering the optimal generator loading and a low number of generator starts (it depends on the type of generator if the latter is an issue). The unnecessary charging of a battery results in a loss of efficiency, since the battery can be charged at lower cost with electric grid energy.

The related-art system described in [NPL1] relies on a priority based switching logic without prediction and optimization, where the different power sources are given priorities. For example, priorities of 1, 2, 3 and 4 are assigned to renewables, a battery, a grid and a generator, respectively. However, the system is not able to achieve fuel or cost optimality.

In the method described in [NPL2], during blackout, the battery is fully discharged and charged and this cycle repeated. However, also this method does not achieve full optimality.

A system described in [PL1] which is provided with a PV generator and a battery uses day-ahead prediction and decides to charge or not to charge the battery during the night depending if the needed energy of the loads is higher or lower than the predicted generated energy by the renewable source. However, this system does not foresee the connection of a generator with PDE as, for example, a Diesel engine generator represents.

A system described in [PL2] relates to an electric vehicle (EV) including a fuel cell (generator), a motor (load) and a battery and controls the EV to improve overall efficiency. However, the solution is not applicable to the type of PDE generator, since for fuel cell more loading reduces efficiency. Additionally, the system of [PL2] works with fixed charging and discharging limits, which would amount to suboptimal operation in the general application.

A certain hardware topology for the connection of a grid, a renewable power source and a battery is proposed in [PL3]. However, the proposal in [PL3] does not consider blackouts or non linear generators.

Related-art systems that deal with blackout prediction are described in, for example, [PL4]-[PL8]. These systems either predict the concrete start time of the blackout or calculate the blackout probability of a certain time instant but do not consider the blackout duration explicitly. In [PL9], only a planned blackout, i.e., a blackout whose start time and end time are known, is considered, so it is assumed that the blackout information is perfectly known. This is generally not the case.

By the way, for some type of applications, the knowledge of the concrete time instant of the blackout is not necessary for optimal operation. For optimal operation of a energy storage and a generator the blackout duration is important. Knowing the blackout duration, and the future load and renewable generation allows the determination of optimal charge/discharge cycles of the pattern together with the right on/off command for the generator.

CITATION LIST

Patent Literature

[PL1]: US 2012/0181864 A1
[PL2]: US 2001/0024105 A1

[PL3]: US 2011/0115295 A1
[PL4]: JP 2004-355219 A
[PL5]: JP 2005-184890 A
[PL6]: JP 2006-101604 A
[PL7]: JP 2007-034639 A
[PL8]: JP 2012 235541 A
[PL9]: WO 2013/002155 A1

Non-Patent Literature

[NPL1]: Technical Whitepaper—SolarConnect™ Energy management solution for Base Stations—A Solar Powered Cellular Base Station [online]. Solar Semiconductor, 2010 [retrieved on 2014 Feb. 26]. Retrieved from the Internet: <URL: http://aptnk.in/wp-content/uploads/2010/05/Technical-Whitepaper.pdf>.

[NPL2]: Ashok Jhunjhunwala, Bhaskar Ramamurthi, Sriram Narayanamurthy, Janani Rangarajan, and Sneha Raj, Powering Cellular Base Stations: A Quantitative Analysis of Energy Options [online]. Telecom Center of Excellence (RiTCOE), Indian Institute of Technology, Madras 2012 [retrieved on 2014 Feb. 26]. Retrieved from the Internet: <URL: http://www.tcoe.in/doc_download.php?doc_id=100>.

SUMMARY OF INVENTION

Technical Problem

The problems with the related-art technology are that it is not possible to achieve optimality or not even sub-optimality of operation. Since there is no information about future load demand, renewable generation and blackout duration (or blackout duration probability function), optimal charge/discharge patterns and generator on/off commands cannot be calculated. In order to derive optimal decision, prediction of future development is necessary. More concretely, following problems I to IV should be considered to derive the optimal decision.

Problem I: The fuel consumption of an energy supply system equipped with a battery and a generator with PDE is high. Therefore, the fuel consumption of the generator must be reduced as much as possible. Without the above-described comprehensive type of prediction and optimization, wrong charging/discharging and generator decisions may be taken which lead to increased fuel consumption.

The related-art technology has often a switching logic which is priority based as described in [NPL1]. However, with this type of technology, even if priority based switching is better than some other approaches, optimality cannot be guaranteed in most of the cases. Low loading of the generator leading to a waste of fuel cannot be avoided in the general case. The related-art technology often works with a fixed upper charge limit and a fixed lower discharge limit for the energy storage. It can be shown analytically that there are a lot of cases where only suboptimal operation and not optimal operation can be achieved with this technology.

In order to minimize the fuel consumption of the generator with PDE (monotonically decreasing), future load, future renewable generation (if available), and blackout duration (if there is an unreliable grid connection) is necessary to know, in order to guarantee that the generator runs always in its most efficient mode and unnecessary battery charging is avoided. The related-art technology that does not provide this functionality needs prediction technology and special optimization and control method. Without prediction of load, generation and blackout duration and without time variant charge and discharge limits, it is not possible to determine the optimal charge/discharge cycle for the battery and the optimal generator start/stop command.

Problem II: The cost (or TCO (total cost of ownership)) of an energy supply system equipped with an energy storage and a generator with PDE is high. Therefore, the running cost of the system should be reduced. Cost optimization is strongly related with the fuel consumption minimization.

Problem III: Guaranteeing reasonable number of PDE generator starts.

Without sophisticated prediction, cost/fuel optimality and reasonable number of PDE generator starts, both, cannot be guaranteed at the same time.

Problem IV: Blackout probability or prediction of exact blackout start time does not help to find the optimal charge/discharge cycle for the battery and the optimal generator start/stop command.

A lot of previous proposals such as [PL4]-[PL9] related with blackout events deal with prediction of the start time of the blackout, or with the blackout start probability of future time instants. However, this type of prediction is not needed and does not help to improve efficiency of this type of energy supply system. If a blackout happens, the energy storage can automatically take over to feed the load for a certain period, while the parameter of optimal future charge/discharge pattern for the energy storage and the parameter of optimal future generator starts can be only be computed (exactly or approximated) if some kind of knowledge about the blackout duration is available.

Problem IV is addressed by a method to predict the blackout duration probability function. This means that not the single blackout duration is predicted, but different blackout durations are given a probability of occurrence and the optimization method tries to derive energy storage charge/discharge commands and generator off/on commands which satisfy different blackout durations.

An exemplary object of the present invention is to solve the problems of the related-art technology and to provide an energy management method and system which can reduce cost, fuel consumption of the generator and keep generator wear within reasonable bounds.

Solution to Problem

According to one exemplary aspect of the present invention, an energy management method for an energy supply system which includes at least an energy storage, a load and a generator with power dependent efficiency includes: calculating two time variant parameters indicating a discharge lower limit and an upper charge limit, respectively, of the energy storage, based on optimization using different kinds of prediction; and controlling, in a real time manner, charging and discharging of the energy storage and operation of the generator, with a certain priorities given to various power sources, such that state of charge of the energy storage is controlled within a region between the discharge lower limit and the upper charge limit.

According to another exemplary aspect of the present invention, an energy management system for an energy supply system which includes at least an energy storage, a load and a generator with power dependent efficiency includes: prediction means for performing different kinds of prediction; optimization means for calculating two time variant parameters indicating a discharge lower limit and an upper charge limit, respectively, of the energy storage, based on optimization using different kinds of prediction; and control means for controlling, in a real time manner, charging and discharging of the energy storage and operation of the generator, with a certain priorities given to various power sources, such that state of charge of the energy storage is controlled within a region between the discharge lower limit and the upper charge limit.

The present invention focuses on the energy management method and system and is not restricted to a certain hardware topology. The present invention may consider also the inclusion of non-linear generators (from the view point of efficiency) others than Diesel engine generators.

These and other objects, features and advantages of the present invention will become more apparent from the following description, taken in conjunction with the accompanying drawings, illustrating by way of example the principles of the invention.

DESCRIPTION OF EMBODIMENTS

Exemplary embodiments of the present invention will be next described with reference to the accompanying drawings.

Figure 1:
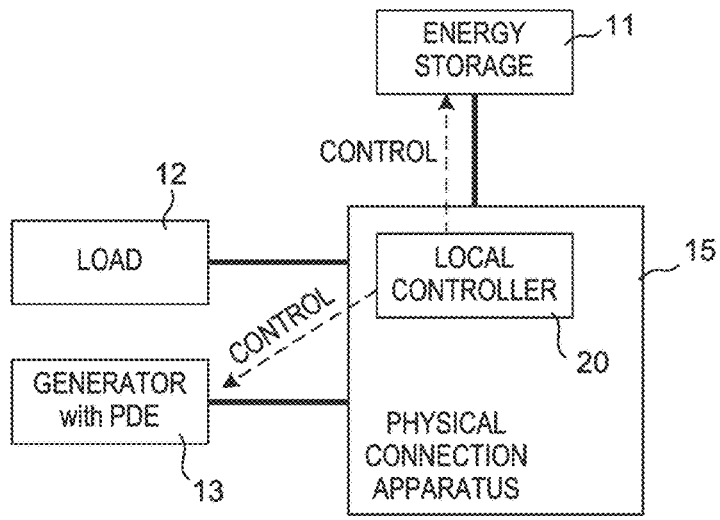
FIG. 1 is a block diagram illustrating an example of a basic arrangement of an energy supply system to which an energy management method according to an exemplary embodiment of the present invention is applied.
Figure 2:
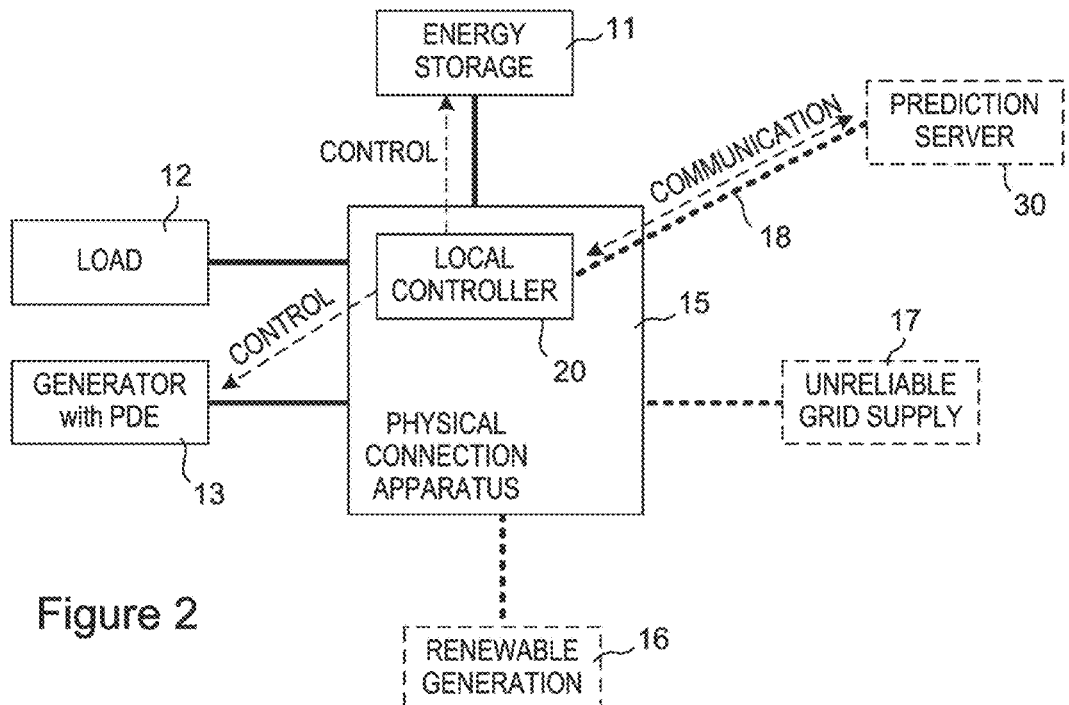
FIG. 2 is a block diagram illustrating another energy supply system with unreliable grid supply.

As shown in FIG. 1, an energy supply system to which an energy management method according to an exemplary embodiment of the present invention generally includes: energy storage 11 such as a Li-ion (lithium-ion) battery, nickel metal hydride battery and other secondary cells; single or aggregated load 12 to which electric power is supplied; and energy generator 13 that needs some kind of fuel. Efficiency (in kWh/L: kilowatt hour per liter) or inefficiency (in L/kWh: liter per kilowatt hour) of generator 13 is dependent on the power that the generator produces. In other words, generator has a characteristic of PDE (power dependent efficiency). Energy storage 11, load 12 and generator 13 are electrically connected by means of physical connection apparatus 20 which is typically some kind of a wiring board. For conversion between direct current (DC) and alternate current (AC), physical connection apparatus 15 may contains switches, a DC/AC converter and an AC/DC converter.

In the exemplary embodiment, charging and discharging power of energy storage 11 and on/off mode of generator 13 can be controlled. For the purpose of this control, physical connection apparatus 15 is equipped with local controller 20. Local controller 20 is a key component of an intelligent energy management system (IEMS) which performing the energy management method of the exemplary embodiment.

The arrangement shown in FIG. 1 is a fundamental arrangement of the energy supply system, and the energy supply system can also be equipped with single or aggregated renewable generation (i.e., renewable power source) 16 such as PV power, wind power, and PV-wind combined power. The energy supply system can be supplied with power from unreliable grid supply 17. Term "unreliable" in this circumstance means that there are grid blackouts where no energy can be provided from the grid. It is assumed that the electricity price from the grid is constant and cheaper than the electricity produced by the generator, no feed-in is allowed. In addition, local controller 20 in physical connection apparatus 15 can be communicated with external prediction server 30 via communication link 18. In case of arranging prediction server 30, prediction server 30 also will functions as a key component of the IEMS.

Figure 3A:
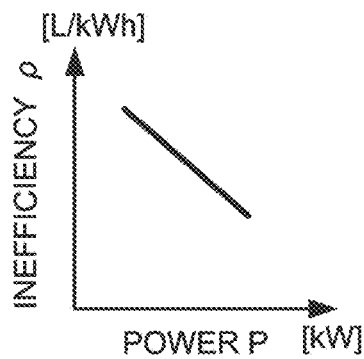
FIGS. 3A to 3C are graphs illustrating possible inefficiency characteristics of a fuel engine generator with PDE (power dependent efficiency).
Figure 3B:
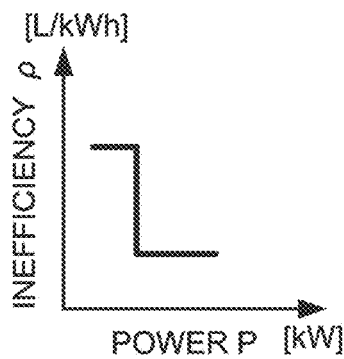
Figure 3C:
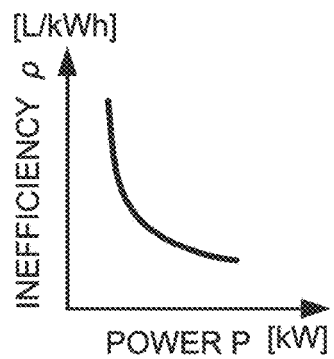

In FIGS. 3A to 3C, some inefficiency characteristics (i.e., inefficiency p in L/kWh versus power P generated by the generator) are shown. The method of the exemplary embodiment can cope with all these different characteristics and also other monotonically decreasing characteristics.

The purpose of the method of the exemplary embodiment is to solve Problems I to IV, especially Problems I and III (i.e., fuel minimization of the PDE generator with a reasonable number of DG starts within a day), described above in the best possible way under reduced information to achieve optimal operation of the energy supply system with/without unreliable grid electric power and/or renewable power generation. The optimal operation is understood as fuel minimization of generator 13 with PDE and cost minimization under consideration of a reasonable number of generator starts per day. This optimal operation has been considered especially difficult in the case where the blackout duration of unreliable grid supply 17 is not known.

As described below, Problem I (i.e., fuel efficiency) is solved by use of prediction of load (and generation), and of, especially introduced, a blackout duration probability function to optimize the charge/discharge sequence of the battery and the generator operation. Since the reduction of fuel leads to reduction of overall cost, Problem II (i.e., cost minimization) is also solved. The fuel efficiency and cost minimization is guaranteed by a special optimization criteria which uses the unnecessary cost (UC), which combines penalizing poor generator operation (as it occurs in the low efficiency region of the generator), generator starts and charged battery at the end of the blackout. Since the optimization criteria include the generator starts, the problem of optimal operation with reasonable number of generator starts (i.e., Problem III) can be also solved by the exemplary embodiment.

Since the exact blackout occurrence is difficult or impossible to predict (Problem IV), the exemplary embodiment introduces an optimization method which is based on the blackout duration probability function, and outputs time variant discharge and charge limits which are used by a real time control module. For predicting the blackout duration probability function, the exemplary embodiment uses different available variables and introduces a special prediction method which is based on a database and artificial intelligence (e.g., ANN (artificial neural network), SVM (support vector machine), etc.) based predictors whose information is combined to get the blackout duration probability function.

In this way, the method of the exemplary embodiment relies on different kind of prediction (i.e., load, renewable, and blackout duration probability function) and a special optimization method taking into account the properties of the blackout duration distribution. The output of the optimization method are generally a time variant lower parameter and especially for a special variation discharging limit and a time variant upper charging limit for the real time control module which implements a policy considering these parameters.

Due to reduced computing power, it is preferable to use a system based on both local controller 20 with restricted computing resources and prediction server 20 with ample computing resources connected with local controller 15 via communication link 18. In prediction server 30, the computationally heavy tasks of the prediction and optimization can be carried out. If communication link 18 is weak or not available at all (which implies also no prediction server), the prediction and optimization functionality is partly or completely carried out in local controller 20 which asks for more computing power of the hardware on which local controller 20 is executed.

Next, details of the intelligent energy managements system (IEMS) according to the exemplary embodiment will be explained.

As described above, the IEMS consists of local controller 20 and, if available, prediction server 30. Prediction server 30 runs typically on sophisticated hardware (e.g., a cloud solution) and has the capacity to run sophisticated prediction algorithms demanding speed and computing power. It is connected with communication link 18 for bidirectional communication (e.g., Internet, GPRS (General Packet Radio Service), GSM (Global System for Mobile communications), etc.) with local controller 20. If prediction server 30 is available, demanding self-learning prediction algorithms on sophisticated hardware are executed by the prediction server and the results send to local controller 20. If prediction server 30 is not available, the prediction is realized in local controller 20.

Figure 4:
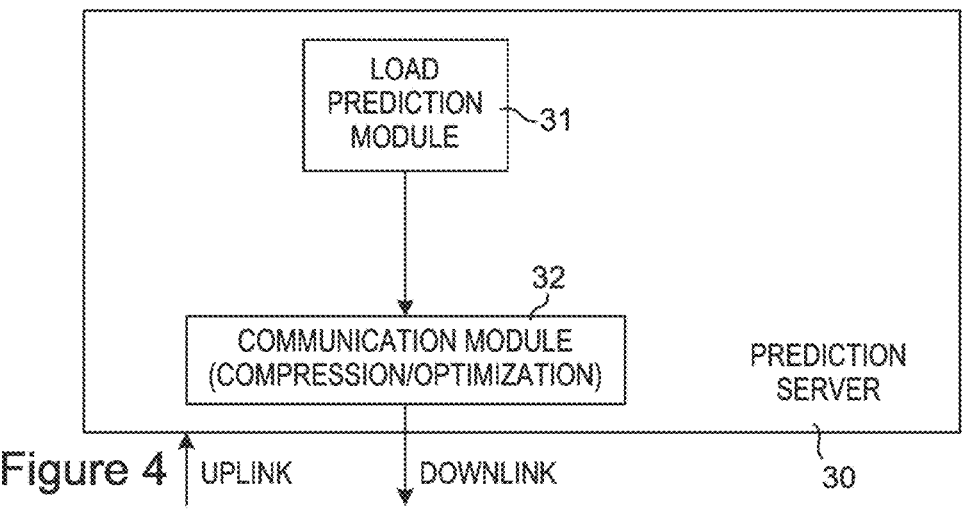
FIG. 4 is a block diagram illustrating an example of a prediction server.
Figure 5:
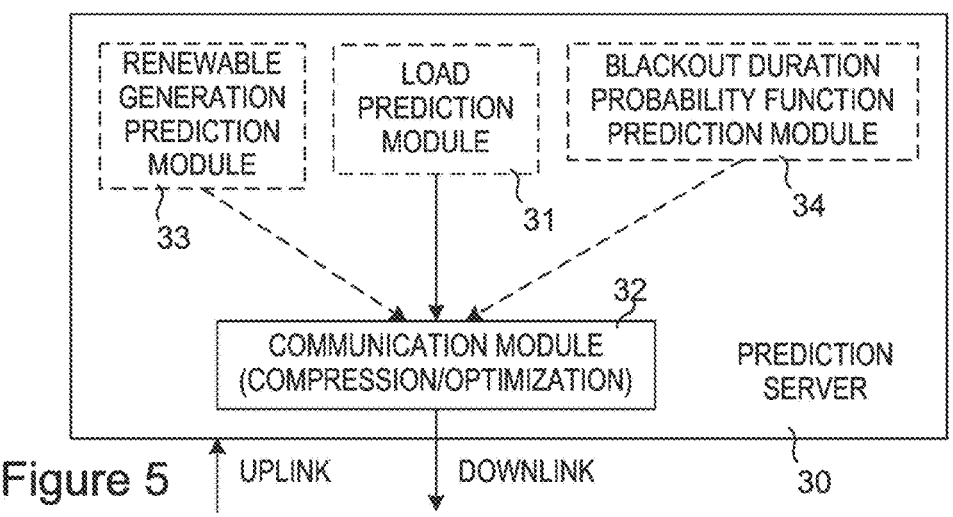
FIG. 5 is a block diagram illustrating another example of the prediction server.

In FIG. 4, the simplest construction of prediction server 30 is shown. Prediction server 30 includes: load prediction module 31 predicting the power consumption of aggregated load 12; and communication module 32 compressing the prediction data and transmitting the compressed data to local controller 20 via communication link 18. If renewable generation 16 is available, renewable power generation prediction module 33 predicting the generated power of renewable generation 16 may be integrated to prediction server 30. In the case of grid supply, blackout duration probability function prediction module 34 predicting the blackout duration probability function is also integrated to prediction server 30. FIG. 5 illustrates prediction server 30 with renewable power generation prediction module 33 and blackout duration probability function prediction module 34.

In prediction server 30, the prediction data predicted by modules 31, 33, 34 are combined and compressed by communication module 32 and sent to local controller 20. How large the prediction horizon and how the information compression in communication module 32 is carried out, depends on the physical and reliability, availability properties of communication link 18. Depending on the quality and reliability of communication link 18, communication module 32 may also contain the optimization method according to the present exemplary embodiment.

Figure 6:
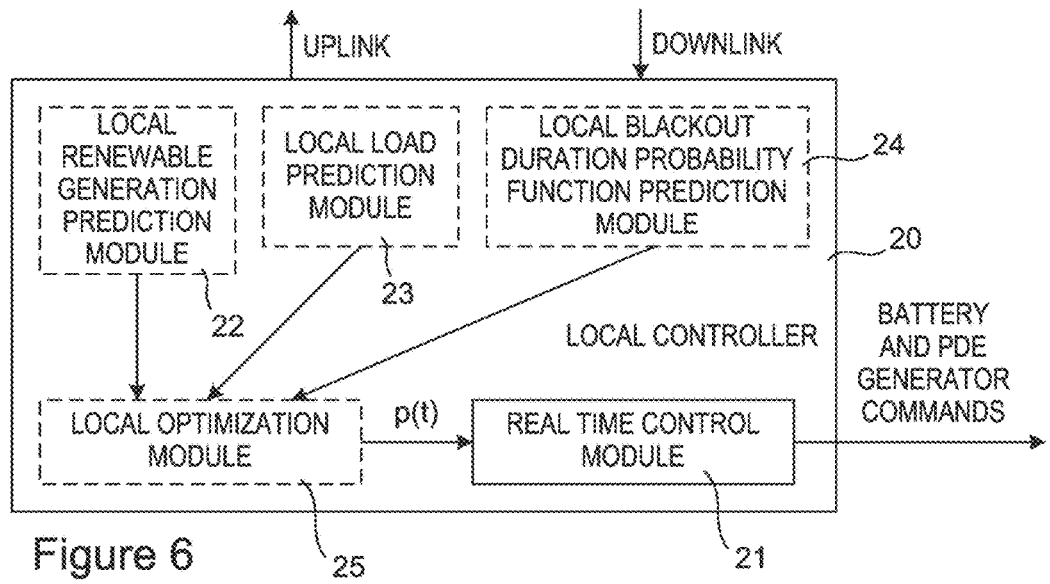
FIG. 6 is a block diagram illustrating an example of a local controller.

In FIG. 6, the construction of local controller 20 is illustrated. Local controller 20 includes: real time control unit 21 controlling energy storage 11 and generator 13; local renewable generation prediction module 22 predicting the generated power of renewable generation 16; local load prediction module 23 predicting the power consumption of aggregated load 12; local blackout duration probability function prediction module 24 predicting the blackout duration probability function; and local optimization module 25 optimizing the predicted data to send the result to real time control module 21. The functionality of these three prediction modules 22 to 24 depends on the quality of the communication link 18. In addition, real time control unit 21 includes a function of collecting, in real time, various measurement values related to the energy supply system.

If communication link 18 is of high quality, local prediction module 22 to 24 and local optimization module 25 are not needed. In this case, the optimization is carried out in prediction server 30, and local controller 20 consists basically of real time control module 21. Hardware requirements for implementation of local controller 20 are low in this case, since all computationally heavy tasks are carried out in prediction server 30.

If communication link 18 is of low quality and unreliable, local prediction module 22 to 24 are used to correct the long term prediction obtained by server 30 based on the local measurements. Based on the corrected prediction, the optimization is carried out by local optimization module 25. The hardware requirements for implementation of local controller 20 are intermediate in this case.

If there is no communication link 18 (and therefore no prediction server 30), the prediction functionality is completely realized in local controller 20. Hardware requirements for implementation of local controller 20 are very high in this case since computationally heavy prediction algorithms must run on the local controller hardware.

Following TABLES 1 to 4 illustrate task sharing between local controller 20 and prediction server 30 for various cases based on existence/inexistence of each of renewable generation 16 and unreliable grid supply 17 in the energy supply system.

TABLE 1

In case of energy supply system consisting of energy storage, load and generator

| Type of communication link | Prediction server | Local controller |
|---|---|---|
| High quality communication link | Load prediction, + optimization | Real time control |
| Low quality communication link | Load prediction, + data compression | Local load prediction, optimization, and real time control |
| No communication link | none | Local load prediction, optimization, and real time control |

TABLE 2

In case of energy supply system consisting of energy storage, load, generator and renewable generation

| Type of Communication link | Prediction server | Local controller |
|---|---|---|
| High quality communication link | Load prediction, and renewable power prediction, + optimization | Real time control |
| Low quality communication link | Load prediction, and renewable power prediction, + data compression | Local load prediction, local renewable power prediction, optimization, and real time control |
| No communication link | none | Local load prediction, local renewable power prediction, optimization, and real time control |

TABLE 3

In case of energy supply system consisting of energy storage, load, generator and unreliable grid supply

| Type of communication link | Prediction server | Local controller |
|---|---|---|
| High quality communication link | Load prediction, and blackout duration probability function prediction, + optimization | Real time control |
| Low quality communication link | Load prediction, and blackout duration probability function prediction, + data compression | Local load prediction, local blackout duration probability function prediction, optimization, and real time control |
| No communication link | none | Local load prediction, local blackout duration probability function prediction, optimization, and real time control |

TABLE 4

In case of energy supply system consisting of energy storage, load, generator, renewable generation and unreliable grid supply

| Type of Communication link | Prediction server | Local controller |
|---|---|---|
| High quality communication link | Load prediction, renewable power prediction, and blackout duration probability function prediction, + optimization | Real time control |
| Low quality communication link | Load prediction, renewable power prediction, and blackout duration probability function prediction, + data compression | Local load prediction, local renewable power prediction, local blackout duration probability function prediction, optimization, and real time control |
| No communication link | none | Local load prediction, local renewable power prediction, local blackout duration probability function prediction, optimization, and real time control |

Figure 7:
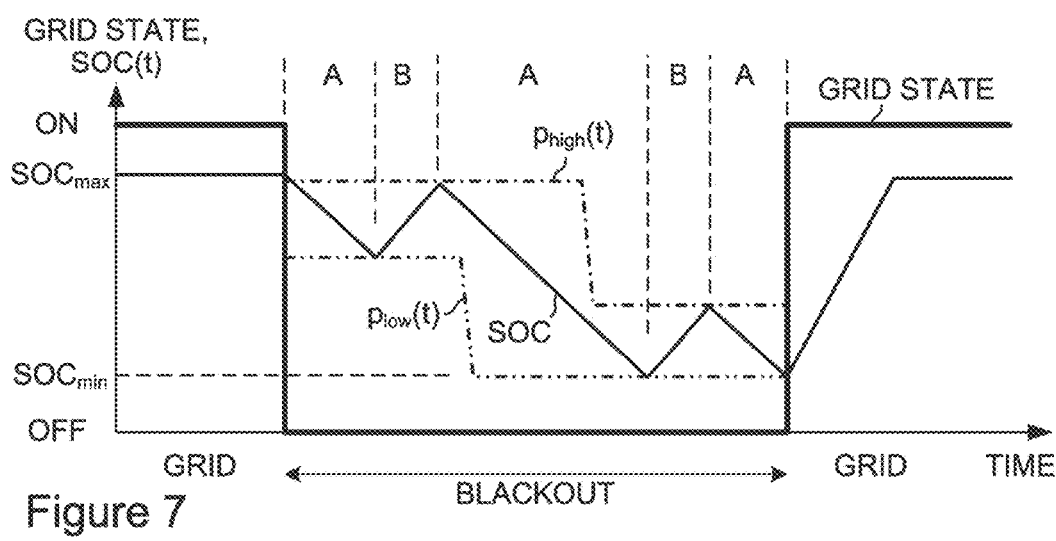
FIG. 7 is a diagram explaining the meaning of policy parameters $p_{low}(t)$, $p_{high}(t)$ with a concrete charge/discharge cycle.

Again, the use of local blackout duration probability function prediction module 24 characterizes the exemplary embodiment together with local optimization module 25. As mentioned before, depending on the quality and availability of communication link 18 and the used hardware, the optimization can be carried out in local optimization module 25 in local controller 20 or communication module 32 in prediction server 30. However, the functionality of them is the same. In the exemplary embodiment, the output of the optimization are two time variant parameters as shown in FIG. 7: lower discharge limit $p_{low}(t)$ and upper charge limit $p_{high}(t)$. Both are inputs for real time control module 25.

In FIG. 7, temporal change of SOC (state of charge) of energy storage 11 such as a Li-ion battery during blackout of the grid is illustrated. Allowable minimum SOC and allowable maximum SOC of energy storage 11 are indicated by $SOC_{min}$ and $SOC_{max}$, respectively. According to the optimization of the exemplary embodiment, both limits $p_{low}(t)$ and $p_{high}(t)$ vary in a range between $SOC_{min}$ and $SOC_{max}$, and the variation range of the SOC of energy storage 11 is controlled within a region defined by time variable limits $p_{low}(t)$ and $p_{high}(t)$. For example, during the blackout of the grid, energy storage 11 is first set to a discharge mode (shown by "A" in the figure) and then, when the SOC reaches $p_{low}(t)$, energy storage 11 is set to a charge mode (shown by "B" in the figure) by starting generator 13. When the SOC reaches $p_{high}(t)$, generator 13 is stopped and energy storage 11 is set to the discharge mode again. The charging and discharging are repeated to constitute charge/discharge cycles.

Next, the optimization method will be explained in detail.

By using the prediction parameters and a model of the energy supply system, these parameters can be find by using optimization technology (e.g., simulation based genetic algorithm based optimization) in order to guarantee optimal operation. Simulation based optimization allows for considering battery charging and discharging efficiency and AC/DC or DC/AC conversion losses in the optimization.

Figure 8:
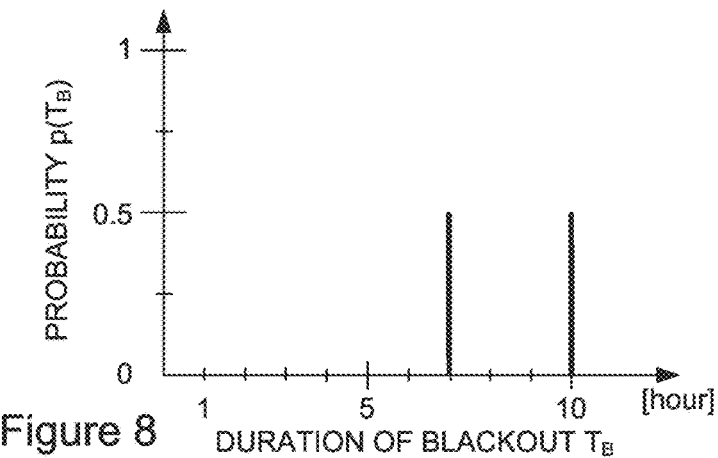
FIG. 8 is a graph illustrating an example of a blackout duration probability function.

The consideration of the blackout duration probability function which is the result of the prediction needs a special method. As shown in FIG. 8, the blackout duration probability function gives an occurrence probability $p(T_B)$ of each blackout having blackout duration time $T_B$. The blackout duration probability function shown in FIG. 8 indicates that occurrence probabilities of blackouts having duration time of 7 hours and 10 hours are 0.5 and 0.5, respectively.

Figure 9:
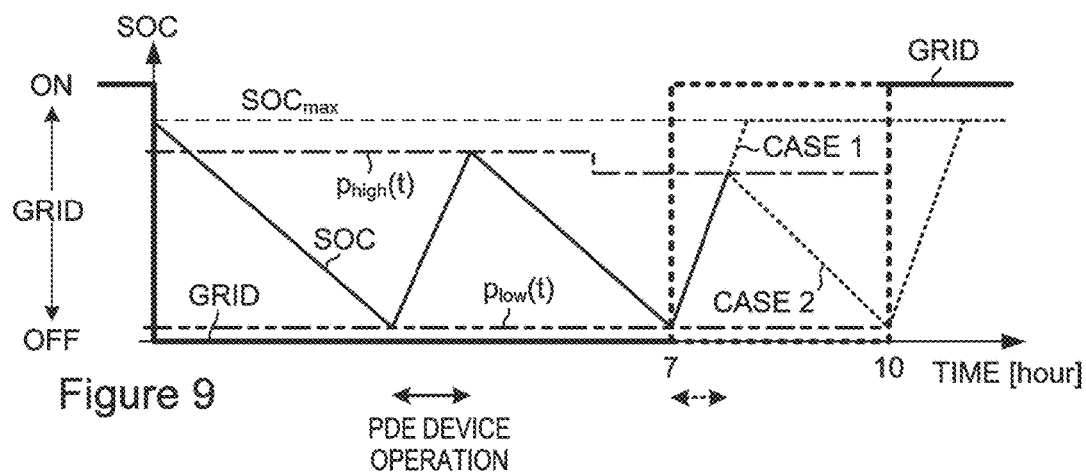
FIG. 9 is a diagram explaining the meaning of policy parameters $p_{low}(t)$, $p_{high}(t)$ with a concrete charge/discharge cycles.

FIG. 9 describes the basic principle of the optimization using the blackout duration probability function by using a simple case to make the concept clear. The underlying assumption is that, there is no renewable generation, constant load and the probability function is only different from zero at time t=7 hours and 10 hours. In both cases, the probability is 50%. So, it is equally probable that the blackout lasts 7 hours or 10 hours. The energy management according to the exemplary embodiment optimizes the time variant lower discharging limit $p_{low}(t)$ and upper charging limit $p_{high}(t)$ in a way that optimum operation is achieved regardless of the duration of the blackout. In this case, it can be shown analytically that this is achieved if the battery is discharged at the end of the blackout which holds true for the 7 hour-blackout (case 1) and 10 hour-blackout (case 2). The result of the local optimization of the exemplary embodiment is shown in FIG. 9. The dashed double-dotted line and the dashed dotted line indicate the time variant lower discharging and upper charging limits $p_{low}(t)$ and $p_{high}(t)$, respectively, resulting from optimization considering the blackout duration probability function. This can be achieved by using expectation based optimization or min-max optimization:

$$\min_{p_{low}(t), p_{high}(t)} E\{UC(p_{low}(t), p_{high}(t))\}$$

or $$\min_{p_{low}(t), p_{high}(t)} \max_{T_B} \{UC(p_{low}(t), p_{high}(t), T_B)\}.$$

The criterion for efficiency evaluation of the charge/discharge pattern is calculated in the following way by introducing the unnecessary cost UC as following:

$$UC = UEEC + GSC + EFC,$$

where UEEC means Unnecessarily Expensive produced Energy Cost and is related to the energy $E_{B,end}$ in the battery at the end of the blackout in the following way:

$$UEEC = a_1 E_{B,end},$$

GSC means Generator Start Cost and is related to the number of generator starts $n_D$ in the following way:

$$GSC = a_2 n_D,$$

EFC means Excessive Fuel Cost which is related to a certain reference Diesel engine generator inefficiency $\rho_{ref}$ in the following way:

$$EFC = a_3 \int_0^{T_B} f(\rho(P(t)) - \rho_{ref}) P(t) dt,$$

where $$f(x) = \begin{cases} x & x \geq 0, \\ 0 & x < 0. \end{cases}$$

Figure 10:
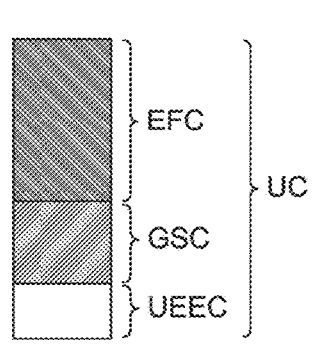
FIG. 10 is a bar graph explaining the composition of the unnecessary cost (UC) consisting of an unnecessary expensive produced energy cost (UEEC), an engine start cost (ESC) and an excessive fuel cost (EFC).
Figure 11:
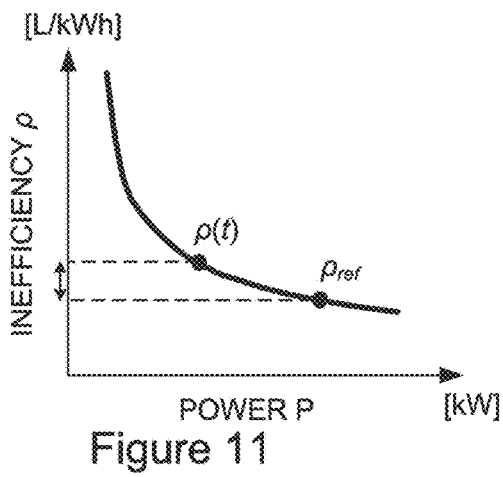
FIG. 11 is a diagram explaining the meaning of the reference (in-)efficiency.

FIG. 10 illustrates relationship among UC, UEEC, GSC and EFC. FIG. 11 is a graph representing typical change of inefficiency $\rho$ against change of generated power P and illustrates relation instantaneous inefficiency $\rho(t)$ and the reference inefficiency parameter $\rho_{ref}$.

The introduction of the unnecessary cost is necessary; otherwise the particular optimization approach would always focus on minimizing the cost for long blackouts. Unnecessary cost means the additional cost that should be avoided by choosing an appropriate charge/discharge pattern.

With the three parameters $a_1$, $a_2$, $a_3$ and the reference inefficiency parameter $\rho_{ref}$, the different cost can be weighted and traded off.

Figure 12:
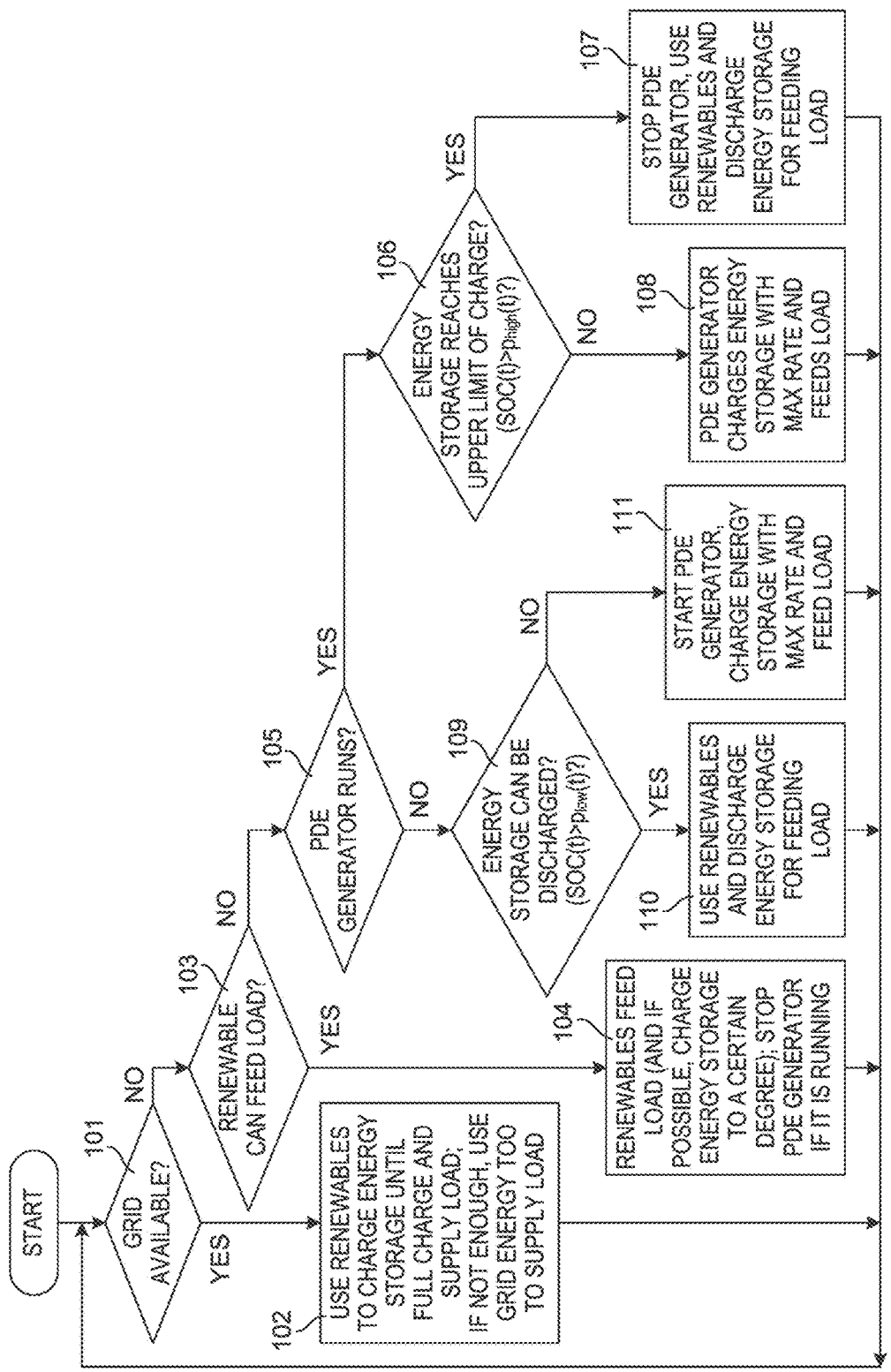
FIG. 12 is a flowchart of operation of a real time control module implementing the policy based on the parameters $p_{low}(t)$, $p_{high}(t)$.

The logic behind real time control module 21 is shown in FIG. 12. The single steps in the flow chart of FIG. 12 are described in detail:

First, in box 101, it is determined whether the grid is available or not. If the grid is available, the energy storage will be charged to its highest level and the load will be supplied with energy by the renewable power source (i.e., renewables) in box 102. If the renewable power source does not suffice or is not available at all, the grid power is also used to achieve this goal (i.e., energy storage charging, supplying load). If the grid is not available at box 101, then it is determined, in box 103, whether the renewable power source can supply the load or not.

If the renewable power source is able to supply the load, it is used to supply the load, and excessive power is used to charge the energy storage until reaching maximum charge limit $p_{max}(t)$ if possible, in box 104. If the generator with PDE has been turned on at the time of this action, the generator is turned off. If the renewable power source is not able to supply the load at box 103, further decision is done in box 105 whether the generator is operating or not. If the generator is operating at box 105, the next decision in box 106 is based on the question if the energy storage has reached the time variant upper charging limit $p_{high}(t)$. If the energy storage has reached the time variant upper charging limit $p_{high}(t)$, the generator is turned off, and by use of renewable power and, if necessary, discharging the energy storage, the load is supplied with power in box 107. If the energy storage has not yet reached the time variant upper charging limit $p_{high}(t)$ at box 106, the generator supplies the load and charges the energy storage with maximal rate in box 108.

If the generator is not operating at box 105, the next decision in box 109 is based on the question if the energy storage can still be discharged or not, in other words if the SOC of the energy storage is larger than the lower limit $p_{low}(t)$ or not. If the energy storage can be discharged, renewable power together with battery discharge power is used to supply the load in box 110. If the energy storage cannot be discharged anymore due to the time variant discharging limit $p_{low}(t)$, the generator is started, the energy storage charged with max rate and the load supplied with power, in box 111.

The operations from box 101 to box 111 are successively or periodically repeated until overall system is halted. Through the operation shown in FIG. 12, real time control module 21 entirely controls the energy supply system to which electric powers are supplied from various power sources such that cost and fuel optimization based on the predictions is achieved. Especially, certain priorities are given to the various power sources and the optimization is carried out by using the priorities. For example, priorities of 1, 2, 3 and 4 are assigned to the renewables, the grid, the energy storage and the generator, respectively.

Generally, the time variant discharge rate is a consequence of the load to feed and, if available, power generated at the renewable power source such as a PV generation. The charge rate resulting from the load to feed and the energy storage charging power which for efficiency is set at highest rate that does not compromise battery life.

Figure 13:
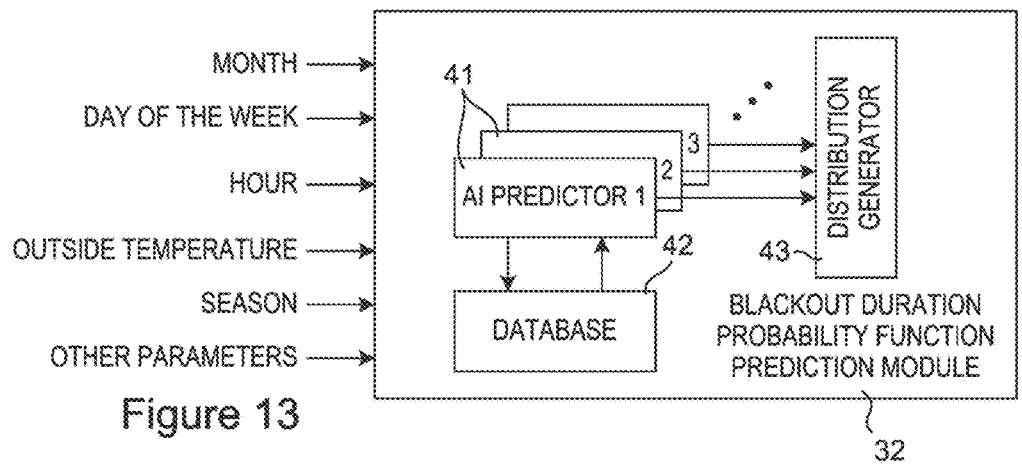
FIG. 13 is a block diagram of an example of a blackout duration probability function prediction unit.

An example of blackout duration probability function prediction module 34 is illustrated in FIG. 13. The inputs to module 34 are variables such as month, day of the week, hour, outside temperature, season and other parameters which describe the current environmental situation of the grid and concrete site to be considered. Blackout duration probability function prediction module 34 includes: various and at least two artificial intelligence based predictors (AI predictors) 41 predicting specific blackout durations with an indication of the reliability of the prediction; database 42 storing historical data necessary for predicting the blackout durations; and distribution generator 43. Artificial intelligence based predictors 41 may be, for example, an artificial neural network (ANN), support vector machine (SVM), and so on. With the results of prediction by artificial intelligence based predictors 41, distribution generator 43 creates a blackout duration probability function which is used for optimization as explained before.

Figure 14:
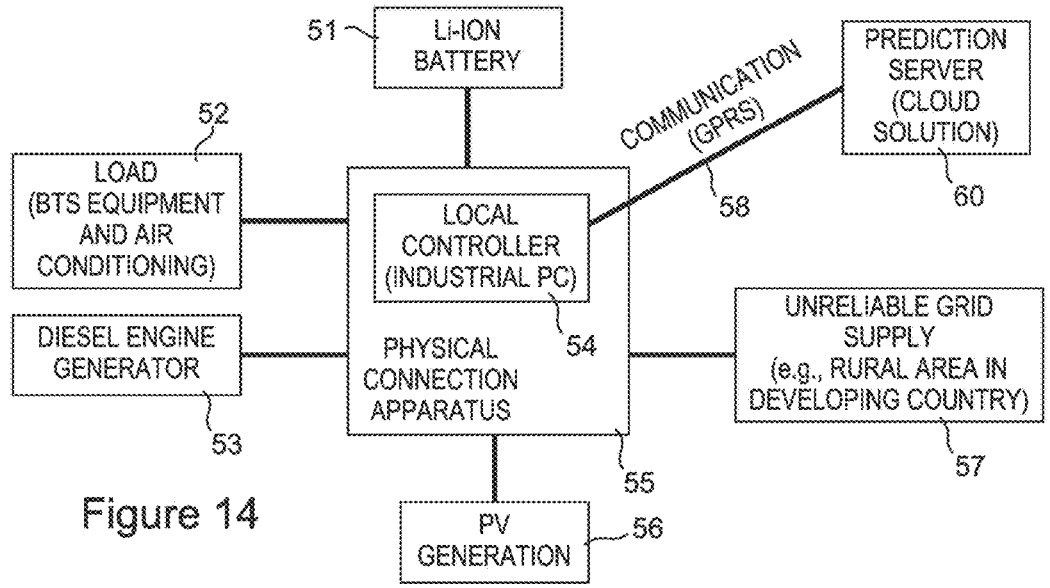
FIG. 14 is a schematic block diagram of a specific example of application of the exemplary embodiment in the region of energy management for energy supply for a base transceiver station (BTS).

In FIG. 14, a practical example of the application of the present exemplary embodiment is illustrated in form of an energy management system for energy supply of a base transceiver station (BTS) for a rural site in a developing country. The illustrated system includes: Li-ion battery 51 as an energy storage, load 52 including BTS equipment and air conditioning; Diesel engine generator 53 as an energy generator; physical connection apparatus 55; PV generation 56 as a renewable generation; unreliable grid supply 57 such as one in a rural area in a developing country with blackout(s) everyday; and prediction server 60. In this example, prediction server 60 is implemented by using cloud solution. Therefore, the functionality of prediction server 60 may be realized by various resources in the cloud which are available via network accesses. Diesel engine generator 53 supplies AC power and has PDE characteristic shown in FIG. 3C. Local controller 54 which is implemented by an industrial PC (personal computer) is arranged in physical connection apparatus 55. Local controller 54 and prediction server 60 are connected with each other via communication link 58 which is, for example, a GPRS channel.

Figure 15:
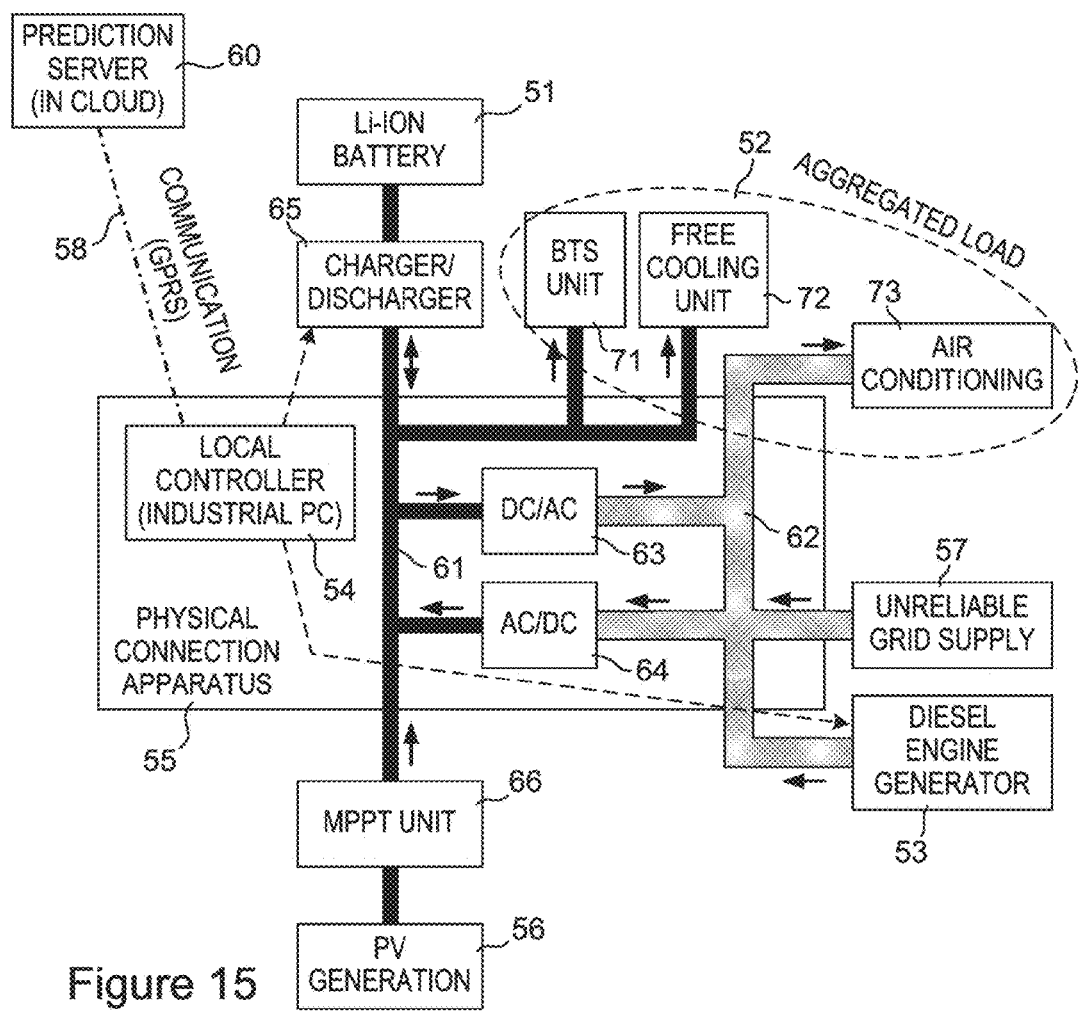
FIG. 15 is a detailed block diagram of the example shown in FIG. 14.

FIG. 15 illustrates in detail the system shown in FIG. 14. Physical connection apparatus 55 includes: DC bus 61 for distributing DC power; AC bus 62 for distributing AC power; DC/AC converter 63 arranged between DC bus 61 and AC bus 62; and AC/DC converter 64 arranged between DC bus 61 and AC bus 62. Li-ion battery 51 is connected to DC bus 61 via charger/discharger 65 which includes a DC/DC converter. PV generation 56 outputting DC power is connected to DC bus 61 via MPPT (maximum power point tracking) unit 66. Diesel engine generator 53 and unreliable grid supply 57 are connected to AC bus 62.

Load 52 includes: BTS unit 71 with constant DC power consumption; free cooling unit 72 which consumes DC power depending on the temperature; and air conditioning 73 which consumes AC power depending on the temperature. BTS unit 71 and free cooling unit 72 are connected to DC bus 61 while air conditioning 73 is connected to AC bus 62.

Local controller 54 gives commands as charge/discharge power to charger/discharger 65 to control charging and discharging of Li-ion battery 57. Local controller 54 gives Diesel generator on/off commands to Diesel engine generator 53. The concrete realization of the charge/discharge power is done by setting the voltage of DC bus 61. This voltage control is realized by other well-known methods which are not explicitly explained, since they are not part of the present invention.

Prediction server 60 implements the basic prediction functions for load prediction based on weather prediction and modelling of the air conditioning, PV generation prediction and the blackout duration probability function prediction. The prediction data obtained by prediction server 60 is transferred from time to time to local controller 54. Local controller 54 uses the transferred data to compute ideal discharge and charge limits for the real time control module. In addition, from time to time data is transferred from local controller 54 to prediction server 60 to improve the quality of the prediction by prediction server 60 by self-learning.

Figure 16A:
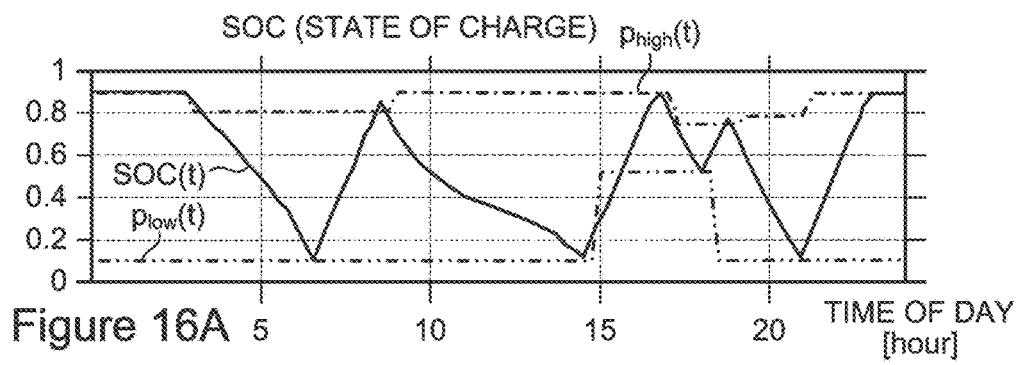
FIG. 16A to 16H are graphs illustrating simulation results of the operation of the system shown in FIGS. 14 and 15.
Figure 16B:
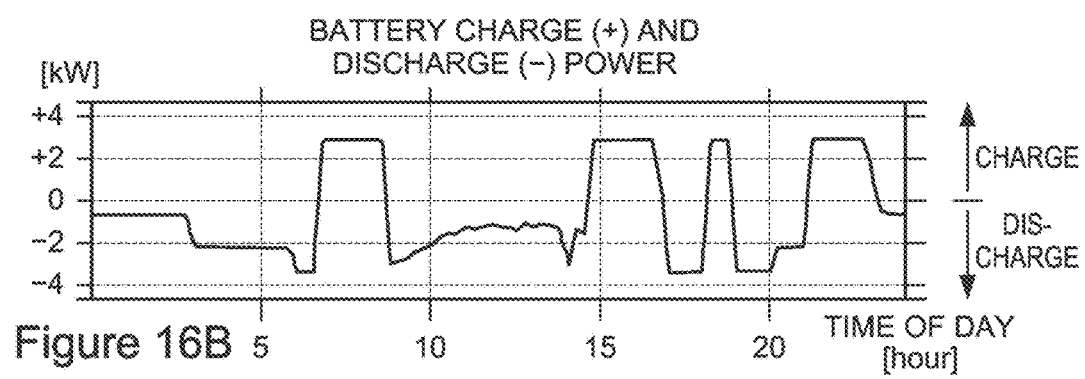
Figure 16C:
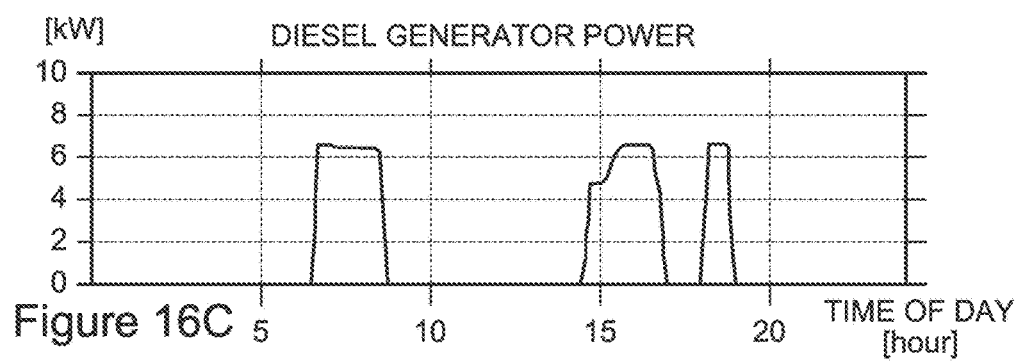
Figure 16D:
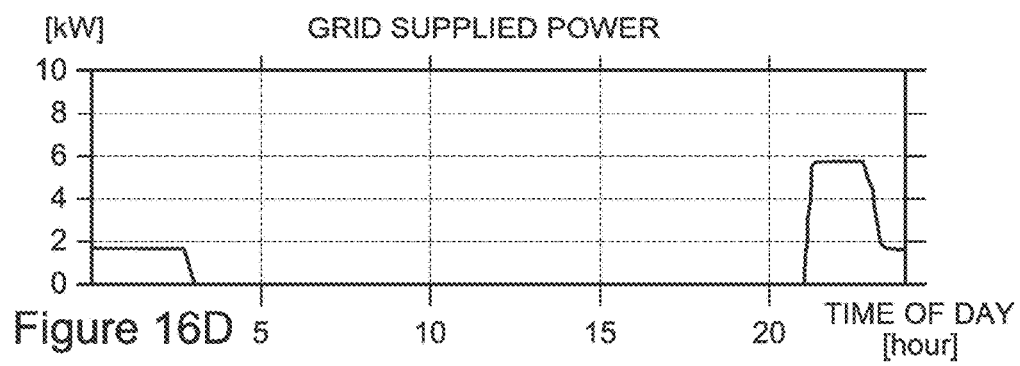
Figure 16E:
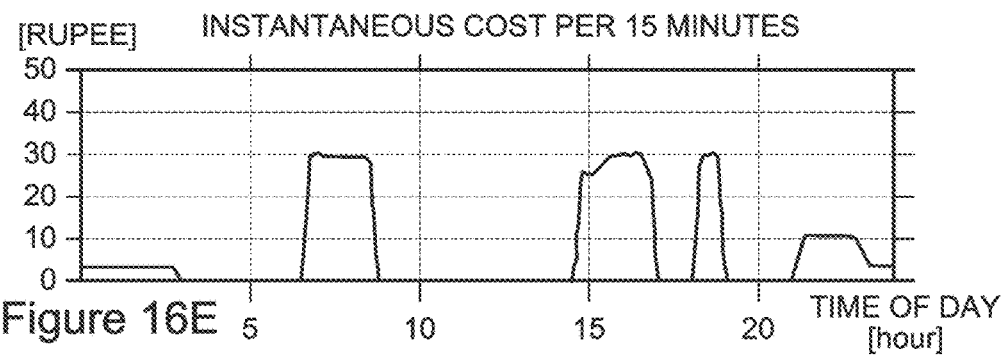
Figure 16F:
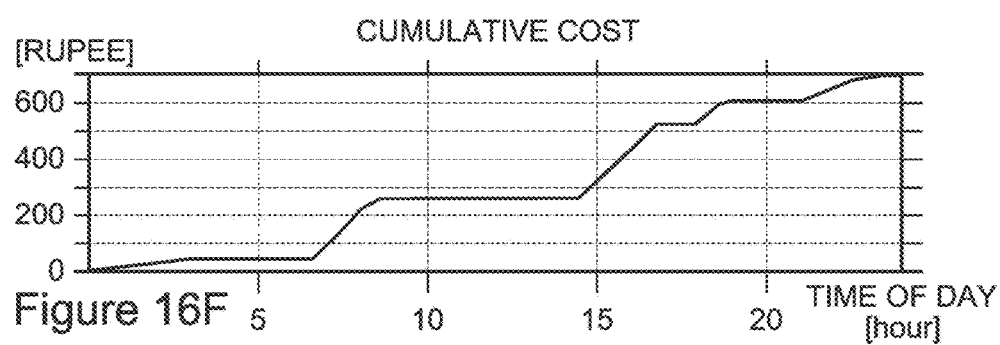
Figure 16G:
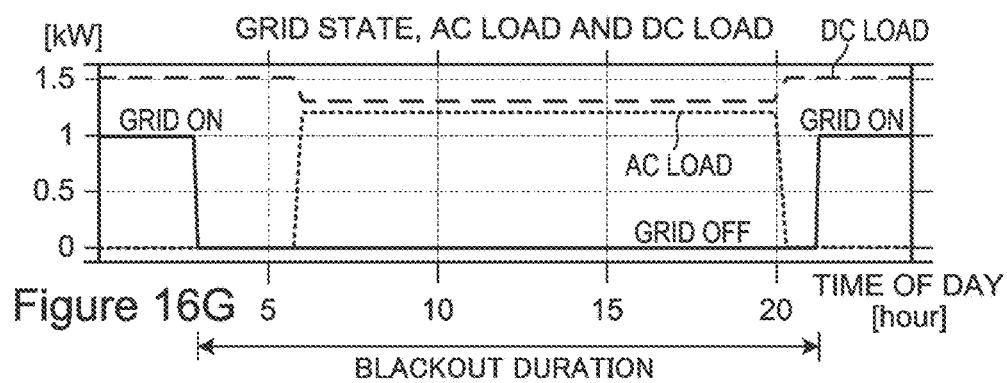
Figure 16H:
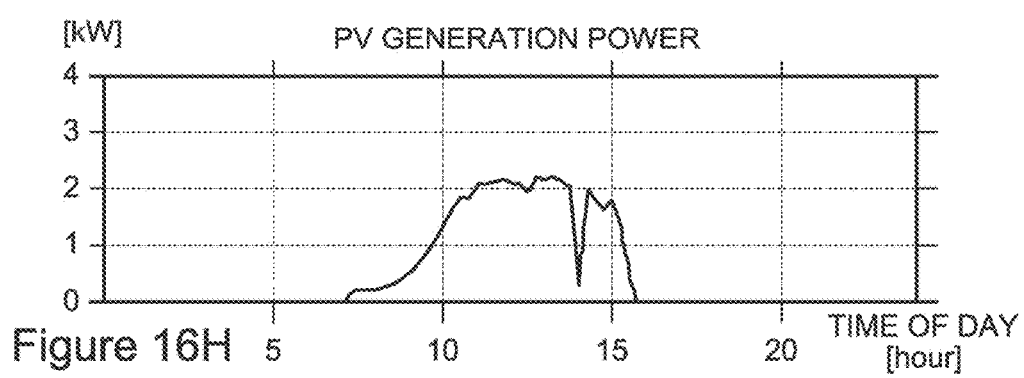

Simulation of operation of the system shown in FIGS. 14 and 15 was carried out to show the validity of the exemplary embodiment. FIGS. 16A to 16H show the results for the various simulation items. Operation within a period of 24 hours, i.e., an entire day, was simulated. In the simulation, it was assumed that blackout occurs from 03:00 AM to 09:00 PM as shown FIG. 16H. The air conditioning, i.e., AC load, is operated from around 06:00 AM to around 08:00 PM. Due to availability of load prediction (FIG. 16G), PV generation prediction (FIG. 16H) and blackout duration probability function, the optimization method is able to compute optimal lower discharging limit $p_{low}(t)$ and higher charging limit $p_{high}(t)$ as shown in FIG. 16A. These two limits $p_{low}(t)$ and $p_{high}(t)$ are input to the real time control module which controls the charging/discharging of the battery and the Diesel engine operation. The resultant SOC change of the Li-ion battery, charging/discharging power, Diesel generator power and grid supplied power are shown in FIG. 16A to 16D, respectively. Cost can be calculated from the Diesel generator power, grid supplied power and the number of the generator starts, and the results of cost calculation are shown in FIGS. 16E and 16F.

As describe above, the intelligent energy management system (IEMS) according to the exemplary embodiment allows for optimal or near optimal operation of the energy supply system under reduced information by use of the prediction technology, especially the new prediction method of the blackout duration probability function prediction to deal with unplanned blackouts, and the special optimization method computing the lower and upper limits $p_{low}(t)$ and $p_{high}(t)$. The optimization method to include the blackout duration probability function uses a special optimization criterion in order to gain robust results and achieving fuel and cost optimality under consideration of a reasonable number of generator starts over the different highly probable blackout durations. The specific procedure of the control according to the exemplary embodiment is shown in FIG. 12.

The difference between the exemplary embodiment and the related-art method described in [NPL2] depends on different parameters: renewable generation pattern, blackout pattern, load pattern, energy storage parameters.

The most important advantageous effect of the exemplary effect is the reduction of the used fuel of the PDE generator. At the same time, a reasonable number of PDE generator starts can be guaranteed. The fuel reduction leads to a cost reduction. In the case of the application of the exemplary embodiment to the energy management system for BTS energy supply, it leads to better operational cost of the BTS, i.e., reduced operating expense (OPEX), and reduced environmental impact due to reduced fuel consumption which means less production of carbon dioxide ($CO_2$) exhaust gas.

These advantageous effects results from the features of the exemplary embodiment that the enhanced prediction capabilities of, for example, load, generation and blackout duration probability function are introduced, the special optimization and control methods are introduced, and the charge/discharge pattern and the generator operation is chosen in a way that the battery is mostly discharged at the end of the blackout, the generator is operated as much as possible near to its optimal operation mode and at the same time the number of generator starts is kept reasonably small. The feature that the battery is most likely discharged at the end of the blackout is advantageous from cost and fuel consumption perspective. The small number of generator starts should reduce wear of the generator. The exemplary embodiment further uses intelligent methods to exploit the reduced information by using self-learning prediction technology.

INDUSTRIAL APPLICABILITY

The invention can be used for energy supply of various systems including: for example, base transceiver stations in telecommunication industry; and a small micro grid with a battery, load(s) and a generator, and, if available, an additional equipment such as renewable power source and/or unreliable grid supply, in energy supply system industry.

The invention as described herein may comprise one, several, all, or any of the exemplary embodiments provided above in any combination. The above-described embodiments of the present invention are intended to be examples only. Alterations, modifications and variations can be effected to the particular embodiments by those of skill in the art without departing from the scope of the invention, which is defined solely by the claims appended hereto.

REFERENCE SIGNS LIST

11 Energy storage;
12, 52 Load;
13 Generator;
15, 55 Physical connection apparatus;
16 Renewable generation;
17, 57 Unreliable grid supply;
18, 58 Communication link;
20, 54 Local controller;
21 Real time control module;
22 Local renewable generation prediction module;
23 Local load prediction module;
24 Local blackout duration probability function prediction module;
25 Local optimization module;
30, 60 Prediction server;
31 Load prediction module;
32 Communication module;
33 Renewable generation prediction module;
34 Blackout duration probability function prediction module;
41 AI predictor;
42 Database;
43 Distribution generator;
51 Li-ion battery;
53 Diesel engine generator;
56 PV generation;
61 DC bus;
62 AC bus;
63 DC/AC converter;
64 AC/DC converter;
65 Charger/discharger;
67 MPPT unit;
71 BTS unit;
72 Free cooling unit;
76 Air conditioning.

The invention claimed is:

1. An energy management method for an energy supply system which includes at least an energy storage, a load and a generator with power dependent efficiency, the method comprising:
calculating two time variant parameters indicating a discharge lower limit and an upper charge limit, respectively, of the energy storage, based on optimization using different kinds of prediction; and
controlling, in a real time manner, charging and discharging of the energy storage and operation of the generator, with a certain priorities given to various power sources, such that state of charge of the energy storage is controlled within a region between the discharge lower limit and the upper charge limit.

2. The method according to claim 1 further comprising:
when a grid power is available to the energy supply system, considering a possible duration of blackout in the grid power to predict a blackout duration probability function,
wherein the two time variant parameters are calculated by using the blackout duration probability function.

3. The method according to claim 2, wherein the two time variant parameters are calculated using unnecessary cost criteria including an unnecessary expensive produced energy cost, a generator start cost and an excessive fuel cost.

4. The method according to claim 3, wherein the prediction of the blackout duration probability function comprises:
predicting specific blackout durations by different artificial intelligence based predictors, each specific blackout duration accompanying an indication of reliability of prediction; and
creating the blackout duration probability function based on results of duration prediction of different artificial intelligence based predictors.

5. The method according to claim 3, comprising:
when a remote server with relatively high computing power and a communication link between a site of the energy supply system and the remote server are available and quality of the communication link is relatively high, performing the prediction and the optimization on the remote server, and performing the controlling in the real time manner on a local controller with relatively low computing power provided on the site of the energy supply system;
when the remote server is available and quality of the communication link is relatively low, performing the prediction on the remote server, and, on the local controller with an intermediate computer power, correcting result of the prediction and performing the optimization and the controlling in the real time manner; and
when at least one of the remote server and the communication link is unavailable, performing the prediction, the optimization and the controlling in the real time manner on the local controller with relatively high computing power.

6. The method according to claim 4, comprising:
when a remote server with relatively high computing power and a communication link between a site of the energy supply system and the remote server are available and quality of the communication link is relatively high, performing the prediction and the optimization on the remote server, and performing the controlling in the real time manner on a local controller with relatively low computing power provided on the site of the energy supply system;

when the remote server is available and quality of the communication link is relatively low, performing the prediction on the remote server, and, on the local controller with an intermediate computer power, correcting result of the prediction and performing the optimization and the controlling in the real time manner; and when at least one of the remote server and the communication link is unavailable, performing the prediction, the optimization and the controlling in the real time manner on the local controller with relatively high computing power.

7. The method according to claim 2, wherein the prediction of the blackout duration probability function comprises:

predicting specific blackout durations by different artificial intelligence based predictors, each specific blackout duration accompanying an indication of reliability of prediction; and creating the blackout duration probability function based on results of duration prediction of different artificial intelligence based predictors.

8. The method according to claim 7, comprising:

when a remote server with relatively high computing power and a communication link between a site of the energy supply system and the remote server are available and quality of the communication link is relatively high, performing the prediction and the optimization on the remote server, and performing the controlling in the real time manner on a local controller with relatively low computing power provided on the site of the energy supply system;

when the remote server is available and quality of the communication link is relatively low, performing the prediction on the remote server, and, on the local controller with an intermediate computer power, correcting result of the prediction and performing the optimization and the controlling in the real time manner; and when at least one of the remote server and the communication link is unavailable, performing the prediction, the optimization and the controlling in the real time manner on the local controller with relatively high computing power.

9. The method according to claim 2, comprising:

when a remote server with relatively high computing power and a communication link between a site of the energy supply system and the remote server are available and quality of the communication link is relatively high, performing the prediction and the optimization on the remote server, and performing the controlling in the real time manner on a local controller with relatively low computing power provided on the site of the energy supply system;

when the remote server is available and quality of the communication link is relatively low, performing the prediction on the remote server, and, on the local controller with an intermediate computer power, correcting result of the prediction and performing the optimization and the controlling in the real time manner; and when at least one of the remote server and the communication link is unavailable, performing the prediction, the optimization and the controlling in the real time manner on the local controller with relatively high computing power.

10. The method according to claim 1, comprising:

when a remote server with relatively high computing power and a communication link between a site of the energy supply system and the remote server are available and quality of the communication link is relatively high, performing the prediction and the optimization on the remote server, and performing the controlling in the real time manner on a local controller with relatively low computing power provided on the site of the energy supply system;

when the remote server is available and quality of the communication link is relatively low, performing the prediction on the remote server, and, on the local controller with an intermediate computer power, correcting result of the prediction and performing the optimization and the controlling in the real time manner; and when at least one of the remote server and the communication link is unavailable, performing the prediction, the optimization and the controlling in the real time manner on the local controller with relatively high computing power.

11. An energy management system for an energy supply system which includes at least an energy storage, a load and a generator with power dependent efficiency, the energy management system comprising:

prediction means for performing different kinds of prediction;

optimization means for calculating two time variant parameters indicating a discharge lower limit and an upper charge limit, respectively, of the energy storage, based on optimization using different kinds of prediction; and control means for controlling, in a real time manner, charging and discharging of the energy storage and operation of the generator, with a certain priorities given to various power sources, such that state of charge of the energy storage is controlled within a region between the discharge lower limit and the upper charge limit.

12. The energy management system according to claim 11, wherein the prediction means includes, when a grid power is available to the energy supply system, calculation means for considering a possible duration of blackout in the grid power to predict a blackout duration probability function, wherein the two time variant parameters are calculated by using the blackout duration probability function.

13. The energy management system according to claim 12, wherein the two time variant parameters are calculated using unnecessary cost criteria including an unnecessary expensive produced energy cost, a generator start cost and an excessive fuel cost.

14. The method according to claim 13, wherein the calculation means includes:

different artificial intelligence based predictors predicting specific blackout durations, each specific blackout duration accompanying an indication of reliability of prediction; and a distribution generator creating the blackout duration probability function based on results of duration prediction of different artificial intelligence based predictors.

15. The energy management system according to claim 13, further comprising a local controller provided on a site of the energy supply system, wherein, when a remote server with relatively high computing power and a communication link between the local controller and the remote server are available and quality of the communication link is relatively high, the prediction means and the optimization means are arranged on the remote server, and the control means is arranged on the local controller with relatively low computing power, when the remote server is available and quality of the communication link is relatively low, the optimization means and the control means are arranged on the local controller with an intermediate computer power while the prediction means is arranged on both the remote server and the local controller, the prediction means on the local controller correcting result by the prediction means on the prediction server, and when at least one of the remote server and the communication link is unavailable, the prediction means, the optimization means and the control means are arranged on the local controller with relatively high computing power.

16. The energy management system according to claim 14, further comprising a local controller provided on a site of the energy supply system, wherein, when a remote server with relatively high computing power and a communication link between the local controller and the remote server are available and quality of the communication link is relatively high, the prediction means and the optimization means are arranged on the remote server, and the control means is arranged on the local controller with relatively low computing power, when the remote server is available and quality of the communication link is relatively low, the optimization means and the control means are arranged on the local controller with an intermediate computer power while the prediction means is arranged on both the remote server and the local controller, the prediction means on the local controller correcting result by the prediction means on the prediction server, and when at least one of the remote server and the communication link is unavailable, the prediction means, the optimization means and the control means are arranged on the local controller with relatively high computing power.

17. The method according to claim 12, wherein the calculation means includes:

different artificial intelligence based predictors predicting specific blackout durations, each specific blackout duration accompanying an indication of reliability of prediction; and a distribution generator creating the blackout duration probability function based on results of duration prediction of different artificial intelligence based predictors.

18. The energy management system according to claim 17, further comprising a local controller provided on a site of the energy supply system, wherein, when a remote server with relatively high computing power and a communication link between the local controller and the remote server are available and quality of the communication link is relatively high, the prediction means and the optimization means are arranged on the remote server, and the control means is arranged on the local controller with relatively low computing power, when the remote server is available and quality of the communication link is relatively low, the optimization means and the control means are arranged on the local controller with an intermediate computer power while the prediction means is arranged on both the remote server and the local controller, the prediction means on the local controller correcting result by the prediction means on the prediction server, and when at least one of the remote server and the communication link is unavailable, the prediction means, the optimization means and the control means are arranged on the local controller with relatively high computing power.

19. The energy management system according to claim 12, further comprising a local controller provided on a site of the energy supply system, wherein, when a remote server with relatively high computing power and a communication link between the local controller and the remote server are available and quality of the communication link is relatively high, the prediction means and the optimization means are arranged on the remote server, and the control means is arranged on the local controller with relatively low computing power, when the remote server is available and quality of the communication link is relatively low, the optimization means and the control means are arranged on the local controller with an intermediate computer power while the prediction means is arranged on both the remote server and the local controller, the prediction means on the local controller correcting result by the prediction means on the prediction server, and when at least one of the remote server and the communication link is unavailable, the prediction means, the optimization means and the control means are arranged on the local controller with relatively high computing power.

20. The energy management system according to claim 11, further comprising a local controller provided on a site of the energy supply system, wherein, when a remote server with relatively high computing power and a communication link between the local controller and the remote server are available and quality of the communication link is relatively high, the prediction means and the optimization means are arranged on the remote server, and the control means is arranged on the local controller with relatively low computing power, when the remote server is available and quality of the communication link is relatively low, the optimization means and the control means are arranged on the local controller with an intermediate computer power while the prediction means is arranged on both the remote server and the local controller, the prediction means on the local controller correcting result by the prediction means on the prediction server, and when at least one of the remote server and the communication link is unavailable, the prediction means, the optimization means and the control means are arranged on the local controller with relatively high computing power.

* * * * *

UNITED STATES PATENT AND TRADEMARK OFFICE
CERTIFICATE OF CORRECTION

PATENT NO. : 10,003,197 B2
APPLICATION NO. : 15/129114
DATED : June 19, 2018
INVENTOR(S) : Alexander Viehweider and Koji Kudo It is certified that error appears in the above-identified patent and that said Letters Patent is hereby corrected as shown below:

In the Specification

Column 6, Description of Embodiments, Line 43; "p" has been replaced with --ρ-- therefor Column 15, Reference Signs List, Line 67; "76" has been replaced with --73-- therefor Signed and Sealed this
Nineteenth Day of February, 2019

Andrei Iancu
*Director of the United States Patent and Trademark Office*